US011319667B2

(12) United States Patent
Bosman

(10) Patent No.: US 11,319,667 B2
(45) Date of Patent: May 3, 2022

(54) SMART HOISTING ROPE

(71) Applicant: DSM IP Assets B.V., Heerlen (NL)

(72) Inventor: Rigobert Bosman, Echt (NL)

(73) Assignee: DSM IP ASSETS B. V., Heerlen (NL)

( * ) Notice: Subject to any disclaimer, the term of this patent is extended or adjusted under 35 U.S.C. 154(b) by 36 days.

(21) Appl. No.: 16/753,055

(22) PCT Filed: Oct. 9, 2018

(86) PCT No.: PCT/EP2018/077472
§ 371 (c)(1),
(2) Date: Apr. 2, 2020

(87) PCT Pub. No.: WO2019/072845
PCT Pub. Date: Apr. 18, 2019

(65) Prior Publication Data
US 2020/0277732 A1    Sep. 3, 2020

(30) Foreign Application Priority Data
Oct. 10, 2017  (EP) ..................................... 17195599

(51) Int. Cl.
*D07B 1/14*    (2006.01)
*G01L 5/101*    (2020.01)
(Continued)

(52) U.S. Cl.
CPC .............. *D07B 1/145* (2013.01); *G01L 5/101* (2013.01); *G06K 19/0723* (2013.01);
(Continued)

(58) Field of Classification Search
CPC ................................ D07B 1/145; G01L 5/101
(Continued)

(56) References Cited

U.S. PATENT DOCUMENTS

| 7,441,464 B2 | 10/2008 | Turnbull et al. | |
| 2009/0115099 A1* | 5/2009 | Goossens | D01F 6/04 |
| | | | 264/290.5 |

(Continued)

FOREIGN PATENT DOCUMENTS

| CN | 104570246 | 4/2015 |
| DE | 10 2012 108 036 | 12/2013 |

(Continued)

OTHER PUBLICATIONS

International Search Report for PCT/EP2018/077472, dated Dec. 14, 2018, 4 pages.

(Continued)

*Primary Examiner* — Allyson N Trail
(74) *Attorney, Agent, or Firm* — Nixon & Vanderhye P.C.

(57) ABSTRACT

The present invention concerns a rope health monitoring system and a rope for such rope health monitoring system whereby the rope comprises objects which are remotely detectable, readable and programmable identification (ID) tags and whereby the rope monitoring system comprises said rope, at least one ID tag reader device mounted along said predetermined path of the rope, to detect at least the identity and optionally the historic health status and/or at least one physical rope parameters of the individual rope section provided with and identified by the at least one ID tag, at least one ID tag writing device, to write a new health status of the individual rope section to the at least one ID tag, at least one means to measure at least one rope operation parameter, a computing unit provided with data, whereby the computing unit is equipped with an algorithm capable to compute the relative longitudinal positioning of individual sections of the rope and the additional damage or damages suffered by individual sections of the rope, compute and record the new health status of the individual sections of the rope, store the new health status of the individual section of
(Continued)

the rope in the corresponding programmable ID tag of the rope.

21 Claims, 2 Drawing Sheets

(51) Int. Cl.
*G06K 19/07* (2006.01)
*G06K 19/077* (2006.01)
*D07B 1/22* (2006.01)

(52) U.S. Cl.
CPC .......... *G06K 19/07758* (2013.01); *D07B 1/22* (2013.01); *D07B 2201/1096* (2013.01)

(58) Field of Classification Search
USPC .......................................................... 294/74
See application file for complete search history.

(56) References Cited

U.S. PATENT DOCUMENTS

| | | | | |
|---|---|---|---|---|
| 2009/0306709 A1* | 12/2009 | Snijder | ................... | A61L 31/04 606/228 |
| 2013/0119256 A1 | 5/2013 | Husmann et al. | | |
| 2016/0108556 A1* | 4/2016 | Vlasblom | ............... | C08L 79/04 428/36.9 |
| 2019/0071282 A1* | 3/2019 | Zapf | ..................... | B66B 7/1215 |
| 2020/0018661 A1* | 1/2020 | Smith | ................. | F16L 55/1157 |

FOREIGN PATENT DOCUMENTS

| | | |
|---|---|---|
| DE | 20 2016 002 171 | 8/2017 |
| EP | 1 699 954 | 9/2006 |
| JP | 2004-146068 | 5/2004 |
| WO | 01/73173 | 10/2001 |
| WO | 2016/059652 | 4/2016 |
| WO | 2017/153250 | 9/2017 |

OTHER PUBLICATIONS

Written Opinion of the ISA for PCT/EP2018/077472, dated Dec. 14, 2018, 6 pages.
Nakajima, "Advanced Fiber spinning technology", Chapter 8, 1994, 21 pages.
McKenna et al., "Handbook of fibre rope technology, Passage", Handbook of Fibre Rope Technology, Jan. 1, 2004, XP002499746, 14 pages.

* cited by examiner

SMART HOISTING ROPE

This application is the U.S. national phase of International Application No. PCT/EP2018/077472 filed 9 Oct. 2018, which designated the U.S. and claims priority to EP Patent Application No. 17195599.0 filed 10 Oct. 2017, the entire contents of each of which are hereby incorporated by reference.

The invention relates to a rope, such as a hoisting rope, comprising a strength member, the strength member comprising primary strands comprising high performance yarns, the rope further comprising objects situated at intervals and distributed along the longitudinal dimension of the strength member. The invention further relates to a rope monitoring system comprising said rope.

Ropes comprising objects distributed at intervals along the longitudinal dimension of a strength member as well as rope monitoring devices are amongst others known from WO2017/153250, WO2016/059652 and U.S. Pat. No. 7,441,464.

WO2107/153250 describes a supporting means for an elevator installation with multiple sensors arranged along the supporting means. The sensors are designed to determine local physical characteristics of the supporting means and to communicate the physical to compute the discard criteria of the supporting means.

WO2016/059652 describes a creep alerting monitoring systems comprising a rope formed of a strength member of synthetic fibers with a plurality of spatially separated remotely detectable objects situated along the long dimension of the rope whereby the change in length of the spatial interval between consecutive remotely detectable objects is monitored over time to alert about too excessive creep resulting in creep rupture.

U.S. Pat. No. 7,441,464 describes a strain gauge sensor system and method for measuring the strain in a fiber rope, where a plurality of magnets define individual gauge lengths along the fiber rope. The change in length of the individual gauge lengths is detected by magnetically sensing a pair of passing magnets, whereby ID tags placed on the rope between the magnets can be detected by an RF reader to identify a particular gauge length being measured.

Ropes mounted in hoisting equipment, such as cranes, are subjected to a complex combination of deteriorating factors, such as dynamic bending of the rope, tension and tension variations, compression, shear, temperature, and/or climate, inflicting damages to the rope. Furthermore, each section of the rope is subjected to its individual set of factors and hence suffers individual damages. The methods described in WO2016/059652 and U.S. Pat. No. 7,441,464 observe damages of a rope or rope section by the state of elongation of the rope or rope section, whereby the critical retirement condition will be based on the elongation at failure only. Nevertheless, the elongation at failure is not an absolute property of the rope or rope section since it is strongly dependent upon the suffered level of tension and duration of tension. In other words, the elongation at break of a rope subjected to a high but short tension may be much lower than the elongation at break of a rope subjected to a lower but permanent tension, whereby other factors like temperature are further parameters add to the equation. Hence, measuring the gradual elongation of the rope is therefor of limited use to predict the optimal point of retirement of a rope.

There is a continuing need to provide improved systems and methods for monitoring the safe and reliable performance of hoisting equipment including the monitoring and identification of the optimal retirement of the employed rope in services which provide an early warning of the loss of structural integrity and, where appropriate, enhance safe deployment thereof.

The object of the present invention is therefore to provide an improved monitoring system and an improved rope for monitoring the performance of hoisting equipment including the monitoring and identification of the optimal retirement of the employed rope in service, providing an early warning of the approaching loss of structural integrity. A further object of the present invention is to provide a monitoring system and a rope which allows preventive maintenance and repair of the hoisting rope. A further object of the invention is to provide a monitoring system and a rope which remains reliable even after dismounting, storing, splicing and/or refitting of the rope.

This object is achieved by a rope monitoring system comprising a rope whereby the rope comprises objects which are remotely detectable, readable and programmable identification, ID, tags and whereby the rope monitoring system comprises at least one sheave, equipped with the rope, wherein the rope is virtually separated in individual rope sections, wherein individual rope sections are provided with and identified by at least one ID tag, the rope being positioned as a load carrying rope along a predetermined path of the hoisting apparatus and over the at least one sheave, wherein the rope monitoring system comprises
   said rope,
   at least one ID tag reader device mounted along said predetermined path of the rope, to detect at least the identity and optionally the historic health status and/or at least one physical rope parameters of the individual rope section provided with and identified by the at least one ID tag when traveling along said path,
   at least one ID tag writing device mounted along said predetermined path of the rope, to write a new health status of the individual rope section to the at least one ID tag when traveling along said path,
   at least one means to measure at least one rope operation parameter during at least one operation of the rope,
   a computing unit provided with data comprising the predetermined rope path geometry, the at least one rope operation parameter, the identity and position of the at least one ID tag and optionally the historic health status of the corresponding rope section,
whereby the computing unit is equipped with an algorithm capable to
   compute, based on said data, the relative longitudinal positioning of individual sections of the rope in respect of the predetermined path of the hoisting apparatus, and the additional damage or damages suffered by individual sections of the rope during said traveling along said path under said at least one rope operation parameter,
   compute and record the new health status of the individual sections of the rope,
   adequately send the new health status of the individual sections of the rope to the corresponding at least one ID tag writing device for storing the new health status of the individual section of the rope in the corresponding at least one programmable ID tag of the rope.

The rope and rope monitoring system according to the invention provide the advantage that the monitoring system is not identifying a retirement or maintenance criterium based on a macroscopic rope property but based on the historic health status of the rope, whereby the rope itself comprises programmable ID tags comprising said historic health status of the virtual rope sections. This provides the further advantage that the rope with which the hoisting apparatus is equipped can be easily exchanged depending on the required hoisting operation. Upon equipping a hoisting equipment with a new or an old rope, the monitoring system will read the embedded ID tags to detect the current health status of the rope. Furthermore, the virtual sections of the hoisting ropes according to the present invention can easily be classified when mounted or unmounted and, where relevant, damaged sections may be selectively removed without losing health information of the remaining rope sections. Therefor a preferred embodiment of the invention concerns the rope and rope monitoring device comprising ID tags comprising the health status of the corresponding virtual rope section.

By hoisting apparatus in the context of the present invention is understood a device for lifting or lowering loads. A hoisting apparatus may further comprise a drum or liftwheel around which rope is positioned as its lifting medium. The load may be attached to the hoist by means of a lifting hook. A typical examples of a hoisting apparatus is a crane.

By sheave is meant herein a curved surface that is used for deflecting a force by means of a tension element, i.e. a rope, passing over its edge, which may be a positive or negative grooved or a flat rim. The term "sheave" includes herein wheel, roller, pulley, gliding shoe, bitt, drum, winch, e.g. a spool or reel around which such a tension element can be wound.

By identification (ID) tags is understood herein an electronic device comprising an integrated circuit for storing and processing information to and from which digital information can be transmitted in a wireless way. Such wireless digital information transmission may be performed via means known in the art, such as GSM, induction, blue tooth, wifi or radio frequency modulation. Preferably the ID tags are radio frequency identification (RFID) tags. RFID tags modulate and demodulate radio-frequency (RF) signals. The ID tags may further comprise a means of collecting power, e.g. from the incident reader signal, and an antenna for receiving and transmitting signals. ID tags in a rope of the invention may be either passive (collecting energy from a nearby ID reader's interrogating signals), active (having local power source such as a battery) or combinations thereof. The tags are remotely detectable, remotely readable and remotely programmable by ID tag readers and/or writers. During operation, an ID tag reader transmits a signal to interrogate the tag. The ID tag receives the interrogation and responds with its identification and optionally other information. Each tag is unique by its identification such that the system can discriminate among several tags that might be within the range of the ID tag reader and read them simultaneously. The ID tags are repeatedly programmable whereby it is understood that programmable refers to more than mere attribution of a unique ID tag identification to an individual ID tag but allow repeated and/or incremental storage of additional information, amongst others of the historic and current health status of the rope or concerned rope section. Therefor the ID tags each comprise data storage capacity sufficient to store such information, preferably each ID tag comprises at least 8 kByte, preferably at least 64 kByte and most preferably at least 512 kByte repeatedly programmable storage capacity. The ID tags are situated at intervals and distributed along the longitudinal dimension of the strength member of the rope. The length of the intervals between consecutive ID tags may be equal or vary widely. It is an advantage of the present invention that the monitoring system is capable to adequately locate and compute rope sections of different length, defined by the interval length of the individual ID tags. Typical distance between two consecutive ID tags may depend upon the other dimensions of the rope, whereby longer and/or thicker ropes will typically have higher distance between ID tags. A preferred length of an interval between consecutive ID tags is between 0.2 and 20 m, more preferably between 0.3 and 10 m and most preferably between 0.5 and 5 m, whereby the distance between two consecutive ID tags is measured as the distance of the centers of said ID tags. Preferably the ID tags are positioned at substantially constant intervals whereby said intervals have preferably a length in the range of 0.5 to 10 m.

The number of ID tags comprised in a rope of the invention may vary widely and depends on the use of the respective rope and rope monitoring system. Preferably a rope according to the invention comprises at least 10, more preferably at least 20 and most preferably at least 50 ID tags.

A rope in the context of the present invention is an elongated body having a length much larger than its lateral dimensions of for example width and thickness or diameter. The rope to be used in accordance with the invention may have a cross-section which is circular, rounded or polygonal or combination thereof. Preferably, ropes having an oblong cross-section, also referred to as belts, or a circular cross-section are used in hoisting operations. By diameter of the rope is herein understood the largest distance between two opposite locations on the periphery of a cross-section of the rope. The diameter of the rope used in accordance with the invention can vary between large limits, e.g. from diameters of 5 mm or less, to diameters of up to 200 mm and even up to 500 mm. Although not a limiting factor, it was observed that the hoisting rope and the monitoring system operate best when said diameter of said rope is at least 10 mm, more preferably at least 20 mm, most preferably at least 30 mm.

The length of the rope of the invention may vary widely and may depend on the application of the operation the rope is employed for. The rope may have a length of at least 5 meters, preferably at least 10 meters, more preferably at least 20 meters and most preferably at least 100 m whereby the maximum length of the rope is not specifically relevant. Potentially the length of the rope is at most 100 km, preferably at most 50 km, more preferably at most 10 km.

The rope according to the invention comprises at least one strength member comprising primary strands, also referred to as load carrying strands. It is generally known in the rope manufacturing industry to make a rope structure where yarns containing fibers are aggregated by twisting or other means into larger rope yarns and then the rope yarns are aggregated to form strands. The strand can be made by laying or braiding the rope yarn or can contain parallel yarns. Preferably, the strands of the rope of the invention carry at least part of the load generated by said hoisting operation. The strands may be assembled in different ways to form the strength member of the rope. Preferably the strength member is a braided construction, a laid construction, a tendon yarn bundle, a synthetic link chain and/or a belt.

The rope may comprise further elements such as a protective cover substantially situated around the strength member. Such cover may be a knitted or overbraided synthetic fiber cover and/or a protective coating.

In the present invention with primary strands is meant those strands that are the first strands that are encountered when the rope is opened up. In general these are the outermost strands of the rope, but may also include a core strand, if present. The primary strands may be made up of further secondary strands.

The strands, e.g. the primary strands, of the strength member of the rope of the invention contain high performance yarns that comprise high performance fibers, also referred to in the present context as high tenacity fibers. By fiber is herein understood an elongate body, the length dimension of which is much greater that the transverse dimensions of width and thickness. Accordingly, the term fiber includes filament, ribbon, strip, band, tape, and the like having regular or irregular cross-sections. The fibers may have continuous lengths, known in the art as filaments, or discontinuous lengths, known in the art as staple fibers. Staple fibers are commonly obtained by cutting or stretch-breaking filaments. A yarn for the purpose of the invention is an elongated body containing at least 2 fibers.

By high performance fibers are herein understood fibers manufactured from a polymer chosen from the group consisting of polyamides and polyaramides, e.g. poly(p-phenylene terephthalamide) (known as Kevler®); poly(tetrafluoroethylene) (PTFE); poly{2,6-diimidazo-[4,5b-4',5'e] pyridinylene-1,4(2,5-dihydroxy)phenylene}(known as M5); poly(p-phenylene-2, 6-benzobisoxazole) (PBO) (known as Zylon®); liquid crystal polymers (LCP); poly(hexamethyleneadipamide) (known as nylon 6,6), poly(4-aminobutyric acid) (known as nylon 6); polyesters, e.g. poly(ethylene terephthalate), poly(butylene terephthalate), and poly(1,4 cyclohexylidene dimethylene terephthalate); polyvinyl alcohols; and also polyolefins e.g. homopolymers and copolymers of polyethylene and/or polypropylene. The preferred high performance fibers are polyaramide fibers and high or ultra high molecular weight polyethylene (HMWPE or UHMWPE) fibers. Preferably the HMWPE fibers are melt spun and the UHMWPE are gel spun, e.g. fibers manufactured by DSM Dyneema, NL.

In a preferred embodiment, the high performance fibers are UHMWPE fibers, more preferably gel spun UHMWPE fibers. Preferably the UHMWPE present in the UHMWPE fibers has an intrinsic viscosity (IV) of at least 3 dl/g, more preferably at least 4 dl/g, most preferably at least 5 dl/g. Preferably said IV is at most 40 dl/g, more preferably at most 30 dl/g, more preferably at most 25 dl/g. The IV may be determined according to ASTM D1601 (2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration. Examples of gel spinning processes for the manufacturing of UHMWPE fibers are described in numerous publications, including WO 01/73173 A1, EP 1,699,954 and in "Advanced Fibre Spinning Technology", Ed. T. Nakajima, Woodhead Publ. Ltd (1994), ISBN 185573 182 7.

The high performance yarns may have a high tenacity and/or a high strength. In the context of the present invention, the high performance yarns have a tenacity of at least 1.0 N/Tex, preferably of at least 1.2 N/Tex, more preferably at least 1.5 N/Tex, eve more preferably at least 2.0 N/Tex, yet more preferably at least 2.2 N/Tex and most preferably at least 2.5 N/tex. When the high performance yarns are UHMWPE yarns, said UHMWPE yarns preferably have a tenacity of at least 1.8 N/Tex, more preferably of at least 2.5 N/Tex, most preferably at least 3.5 N/Tex. Preferably the high performance yarn has a modulus of at least 30 N/Tex, more preferably of at least 50 N/Tex, most preferably of at least 60 N/Tex. Preferably the UHMWPE yarn has a tensile modulus of at least 50 N/Tex, more preferably of at least 80 N/Tex, most preferably of at least 100 N/Tex. In the context of the present invention tensile strength and tensile modulus are defined and determined on multifilament yarns as specified in ASTM D885M, using a nominal gauge length of the fibre of 500 mm, a crosshead speed of 50%/min and Instron 2714 clamps, of type "Fibre Grip D5618C". The modulus is determined as the gradient between 0.3 and 1% strain.

Strength members comprising the high performance yarns may provide ropes with high strength. Therefor embodiments of the present invention concern rope and rope monitoring system wherein the rope has a tenacity of at least 0.50 N/tex, preferably the rope has a tenacity of at least 0.60 N/tex, more preferably of at least 0.70 N/tex, even more preferably 0.80 N/tex and most preferably at least 1.00 N/tex. In a further embodiment of the invention, the strength member has a tenacity of at least 0.9 N/tex, preferably at least 1.1 N/tex, more preferably at least 1.3 N/tex and most preferably at least 1.3 N/tex.

Preferably the ropes of the invention have high tenacity and high diameters. The combination of these features provides ropes with a breaking strength, also called maximum break load (MBL) of at least 10 kN, more preferably of at least 50 kN and most preferably of at least 100 kN. The MBL may be obtained by testing according to ISO 2307, whereby the tenacity of the rope is calculated by dividing said MBL by the titer of the rope.

The primary strands may be arranged together to form the at least one strength member of the rope of the invention. The strength member can be made by laying or braiding the strands or by parallel bundling of the individual strands. In a preferred embodiment of the invention the strength member is of a laid construction, preferably said laid construction comprises 3, 4, 6, or 6+1 load carrying primary strands. In another preferred embodiment of the invention the at least one strength member is of a braided construction, preferably said braided construction comprises 6, 8, or 12 primary strands. The advantage of a braided or laid construction is the availability of a stable central channel within the braided or laid construction allowing the accommodation of the ID tags. Therefor in a preferred embodiment of the present invention, the at least one strength member is of a braided construction wherein the ID tags are positioned without restraint between the load carrying strands of the braided strength member. Preferably, the ID tags are positioned in the central axis of the braided strength member construction. It was observed that such constructions of ropes according to the invention are easy to manufacture from braided strength members by placing the ID tags at adequate positions within the strength member, allowing for a great flexibility regarding position and distance between the individual ID tags whereby the ID tags are embedded in the braided construction without restraint and can easily be removed or repositioned therein. In the context of the present invention, without restraint has to be understood that the tag is positioned without further, additional means such that it can be removed from the construction by mere opening of the braid and without further damaging said construction. Optionally the ID tags may be retained in the allocated positions by fastening means such as glues, adhesive tapes, etc.

In an alternative embodiment, the ID tags are located at predetermined intervals and distributed along the longitudinal dimension of an elongated carrier element. Such elongated carrier element is a body of substantially the same length as the rope and/or the strength member. Typically an elongated carrier element has the shape of a bar, a stick or a tube. The carrier element may for example be a rod made from a thermoplastic material whereby the ID tags are embedded. The thermoplastic material may be but is not limited to polyethylene, polypropylene or any copolymers thereof, polyamide, polyester and polystyrene. The elongated carrier element may be centrally located within the braided or laid strength member of the inventive rope, whereby the load carrying strands of the at least one strength member are arranged such to surround the elongated carrier element. Alternatively the elongated carrier element may be centrally located within the braided or laid structure of a primary strand of the strength member, said braided or laid load carrying strand will form with other primary strands the at least one strength member of the rope of the invention. Such preferred constructions of the strength member of the inventive rope have the advantage that the rope may be more readily constructed from prefabricated units like carrier element and strands while still providing sufficient flexibility in constructing the rope with required strength and performance properties. Alternatively, the elongated carrier element may itself be made, for example by braiding or laying, from sub-strands comprising high performance fibers of the invention, whereby the ID tags are positioned within the sub-strand construction at adequate intervals, forming together a primary strand of the strength member construction. Accordingly, a preferred embodiment of the present invention is a rope wherein the elongated carrier element is or forms part of a primary strand of the strength member or wherein the elongated carrier element forms the longitudinal core section of the strength member. In a further preferred embodiment, the elongated carrier element has a braided construction comprising the ID tags. In an alternative further preferred embodiment, the elongated carrier element is a thermoplastic rod comprising the ID tags.

In a preferred embodiment of the invention, the rope has a length of at least 100 m, a diameter of at least 10 mm, a tenacity of at least 0.8 N/tex, a maximum break load of at least 10 kN, comprises at least 50 ID tags distributed along the longitudinal dimension of the braided strength member, wherein the intervals are substantially equal in length and in the range of 0.5 to 5 m.

In the rope monitoring system of the invention, the rope is virtually separated in individual rope sections. The individual rope section can be of substantially identical length or differ along the length of the rope. The length of the virtual rope sections is substantially defined by the distance between the individual ID tags, whereby a virtual rope section may be provided with and identified by one or more ID tags. One and the same ID tag may identify more than one virtual rope section whereby said virtual rope sections are overlapping. The virtual rope sections each identified by at least one ID tag may be overlapping, adjacent and/or discrete sections of the rope. The length of the virtual rope sections may vary widely and will be depending upon the dimension of the rope, the number and distance between the ID tags and its use. Typical length of the virtual rope sections may be between 0.2 and 20 meters, preferably between 0.3 and 10 meters and more preferably between 0.5 and 5 meters. The number of ID tags per virtual rope section may be one or more, preferably one.

During operation of the rope monitoring system, the rope is positioned as a load carrying rope along a predetermined path of the hoisting apparatus. Said path comprises at least one sheave, preferably the path comprises 2 or more sheaves.

The rope monitoring system according to the invention comprises at least one ID reader device mounted along the predetermined path of the rope. The ID tag reader device may emit and receive radio-frequency signals that allow to detect and identity at least one ID tag. Optionally the ID tag may transmit further information to the ID reader, such as previously programmed information and/or a measured parameter. The previously programmed information may be the historic health status of the virtual rope section and the measured parameter may be a physical rope parameter of the individual rope section comprising and identified by the ID tag.

The rope monitoring system further comprises at least one ID tag programming device (also called writing device) mounted along the predetermined path of the rope. The ID writing device may emit and receive radio-frequency signals to detect and identity at least one specific ID tag, followed by writing a new health status of the individual rope section to the at least one ID tag. Preferably the ID tag reading and the ID tag writing device are combined into a single ID tag reader/writer unit whereby reading and writing may be performed sequentially or simultaneously.

The rope monitoring system preferably comprises two or more ID readers and writers, respectively, whereby it will be obvious to the skilled person where such ID tag reader and/or writer devices are ideally placed along the predetermined path. Preferably the two or more ID tag readers and/or writers are spread over the predetermined path at critical path positions. Critical positions may be in the vicinity of the reeling system, in vicinity of the sheave or sheaves, but may further be any positions along the predetermined rope path where such electrical equipment can safely be installed.

In operation, the reading and writing devices need to identify the concerned ID tag and read and/or write relevant information from and/or towards the ID tag. Preferably such process is performed within a timeframe of less than 1 second, preferably less than 0.1 second and more preferably less than 0.01, whereby the rope monitoring system will be suited for rope speeds of at least 2, preferably at least 5 and most preferably at least 10 m/s. Preferably the ID tags have writing speeds of at least 1 Mbit/s, preferably 5 Mbit/s, more preferably 10 Mbit/s and most preferably at least 25 Mbit/s.

The rope monitoring system further comprises at least one means to measure at least one rope operation parameter during at least one operation of the rope. By rope operation parameters is understood herein values representing the conditions under which the rope is operated, especially conditions of operation that negatively affect the lifetime of the rope. Such conditions of operation may be but are not limited to parameters concerning the hoisted load like mass, acceleration, vibration and parameters concerning the hoisting operation like direction, speed, acceleration, slippage, tension, compression or torsion of the rope. Means to measure rope operation parameters may be yet installed on the hoisting apparatus for its operation without the rope monitoring system or may be specifically installed for the present system. Accordingly, a preferred embodiment of the present invention concerns a rope monitoring system wherein the at least one means to measure at least one rope operation parameter detects one or more parameters selected from the mass of the hoisted load, acceleration of the hoisted load, vibration of the hoisted load, operating direction of the rope, speed of the rope, acceleration of the rope, slippage of the rope, traction to the rope, pressure to the rope, and tension of the rope.

In a preferred embodiment of the present invention the rope monitoring may be further improved by computing the health status of the rope based on physical rope parameters. By physical rope parameters are understood in the context of the present invention parameters that describe at least one local condition attributable to one or more virtual rope sections of the rope along the predetermined path. Such parameters may for example be, radiation, ambient or core temperature, torsion, shear, tension and/or compression, and moisture level. Said physical rope parameters may be measured by means common in the field, whereby said means may be integrated or separate from the ID tag readers and/or ID tag writer along the predetermined rope path. Said means may also be integrated in the rope, especially in some or all of the ID tags present in said rope, whereby the respective physical rope parameter is transmitted individually or combined with other the ID tag reader information. Therefor a preferred embodiment of the present invention concerns a rope monitoring system and a rope comprising at least one further means to measure a physical rope parameter of at least one virtual rope section. Preferably said means is integrated in at least one ID reader device mounted along the predetermined path of the rope or is integrated in at least one ID tag present in the rope. In another preferred embodiment of the present invention the at least one physical rope parameter is selected from ambient or core temperature, shear, torsion, tension, compression and moisture level. In an alternative embodiment, the rope does not comprise any means to measure physical rope parameters whereby the objects situated at intervals and distributed along the longitudinal dimension of the strength member consist of remotely detectable, remotely readable and remotely programmable identification tags.

The rope monitoring system further comprises a computing unit. Said unit is provided with data comprising the predetermined rope path geometry, the at least one rope operation parameter, the identity and position of the at least one ID tag and optionally the historic health status and/or a physical rope parameter of the corresponding rope section. In this context the term "provided with data" means that the data are available to the computing unit in any form, such as part of an algorithm, stored in the form of a database or individual data points in a volatile or non-volatile memory, by analogue or digital input, retrievable from measuring devices or auxiliary equipment. The computing unit is further equipped with an algorithm capable to compute, based on said data the relative longitudinal positioning of individual sections of the rope in respect of the predetermined path of the hoisting apparatus, and the additional damage or damages suffered by individual sections of the rope during said traveling along said path under said at least one rope operation parameter and optional physical rope parameter. The capability to computing additional damage or damages suffered during said traveling along said path under said at least one rope operation parameter by individual sections of the rope based on the data available to the computing unit is enabled by a profound knowhow of parameters and conditions inflicting damages to the rope when developing said algorithm. Said algorithm computes and record the new health status of the individual sections of the rope. Such computing may be done by incrementally summing the respective damages of the individual virtual sections of the rope for each such section on a predefined time or operation level.

Preferably the damage or damages suffered by individual sections of the rope are aggregated to a parameter or parameters indicating the remaining lifetime of these individual section of the rope. Typically the remaining lifetime of the individual rope sections is expressed as a percentage of the mint conditions of a new rope or rope section, for example expressed as 100%. During the operation of the hoisting apparatus, the herein described rope monitoring system will accumulate operating conditions and compute individual damages suffered by the different conditions to which the rope has been subjected. The aggregated damage of a specific section may for example result in a local rope lifetime of 50% whereby a rope section in its vicinity, having been subjected to similar tension history but to less passes over a sheave, may have a local rope lifetime of 80%. The respective remaining lifetimes of the rope may be inspected at any moment and may result in an adequate modification of the hoisting equipment to result in a more homogeneous damage profile of the rope and hence extend overall lifetime of the rope. Alternatively, the hoisting equipment might be used in such a way to predominantly damage specific sections of the rope, whereby such sections can be removed during preventive maintenance. As a further preferred embodiment, the rope monitoring system according to the invention comprises a computing unit that provides an alerting signal when the remaining lifetime of at least one virtual section of the rope reaches a predefined limit.

Once the computing unit has computed at least one new health status of at least one virtual sections of the rope, the computing unit may store said new health status and/or may send said new health status to the corresponding at least one ID tag writing/programming device for storing the new health status of the individual section of the rope in the corresponding at least one programmable ID tag of the rope. The writing of the new health status of a virtual rope section to the corresponding ID tag has the advantage that the rope as such may serve as redundant memory, in addition to the computing device and potentially an external storage device for the health status of the individual rope sections. The presence of the health status in the rope result in a more robust rope management. Ropes may more readily be dismounted from hoisting equipment, whereby a dismounted rope will carry its health history along its length. Reduction of rope length via splicing or cutting will have no further safety impact since upon mounting of the transformed rope, the rope monitoring device will retrieve all relevant information from the rope itself. Furthermore, a rope in storage can easily be scanned by hand and judged upon its fitness for a specific use.

Figure 1A:
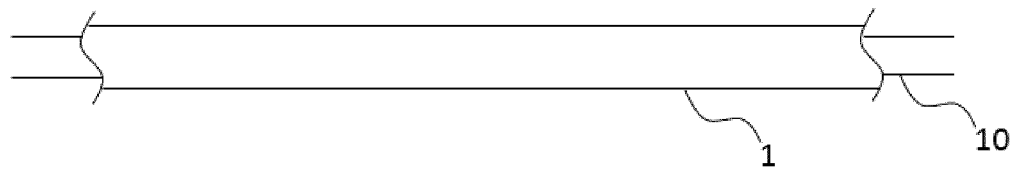
FIG. 1A is a top plan view of the rope 1 of the invention showing the rope and a single strength member 10 of the rope.
Figure 1B:
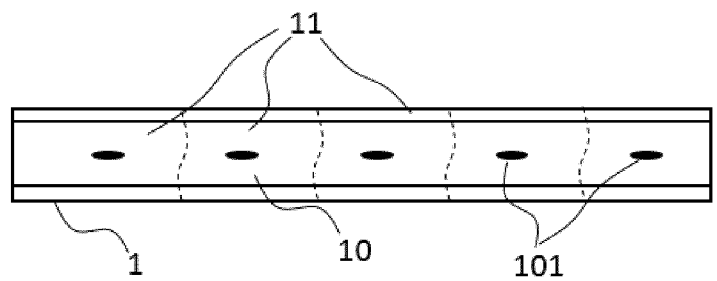
FIG. 1B is a cross-section view of the rope 1 of the invention, depicting the strength member 10, the virtual rope sections 11 and the therein embedded ID tags 101.
Figure 2:
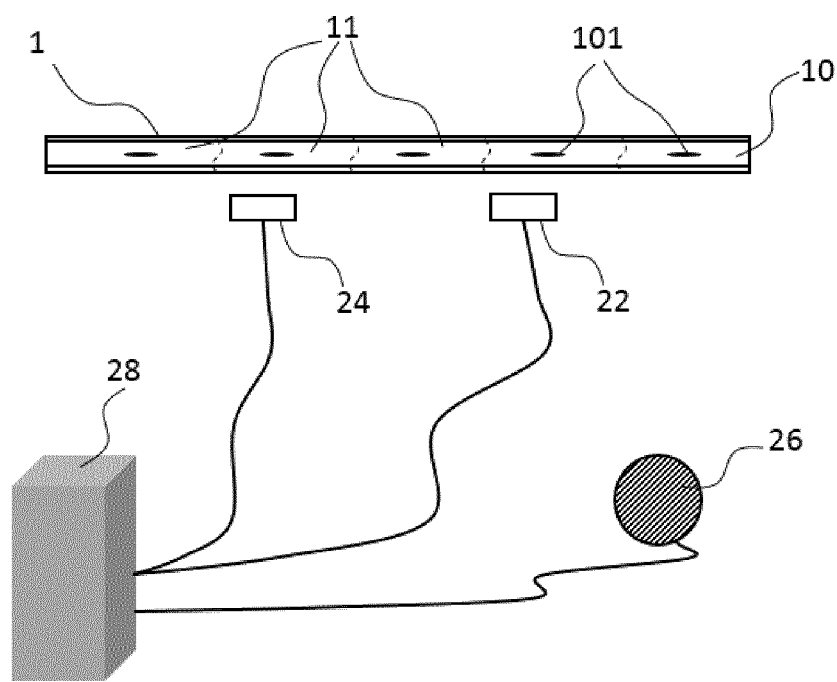
FIG. 2 is schematic view of the rope monitoring system of the invention. The rope monitoring system comprises the rope 1 which is virtually separated in individual rope sections 11 provided with an ID tag 101. An ID tag reader device 22 and an ID tag writer device 24 are mounted along the rope path. A computing unit 28 is connected to the reading device 22 and writing device 24 as well as to a means 26 to measure at a rope operation parameter.
Figure 3:
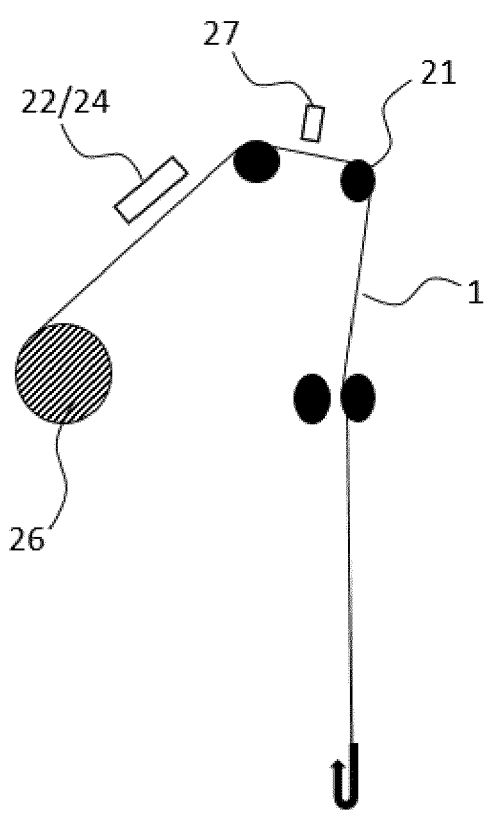
FIG. 3 is a schematic view of a hoisting operation equipped with the rope monitoring system of the invention. The rope 1 is equipped with a hook, mounted over a sheave 21 and wound onto a winch representing a means 26 to measure the tension on the rope during operation. An ID tag reader/writer 22/24 is mounted along the determined path of the rope. The rope monitoring system in FIG. 3 further comprising a means 27 to measure a physical rope parameter, such as a thermometer.

The invention claimed is:
1. A rope for a hoisting apparatus, the rope comprising:
a strength member; and objects situated at intervals and distributed along the longitudinal dimension of the strength member wherein the objects are remotely detectable, readable, and programmable identification (ID) tags, wherein the rope is virtually separated in individual rope sections, wherein at least one ID tag is provided at each individual rope section, wherein the at least one ID tag identifies the respective individual rope section, wherein the at least one ID tag further stores a health status of the respective individual section of the rope as a parameter or parameters indicating a remaining lifetime of the individual section of the rope.

2. The rope according to claim 1, wherein the remaining lifetime of the individual rope sections is expressed as a percentage of the mint conditions of a new rope or rope section.

3. The rope of claim 1 wherein the ID tags are located at predetermined intervals and distributed along the longitudinal dimension of an elongated carrier element, wherein the elongated carrier element has a braided construction comprising the ID tags.

4. The rope of claim 3 wherein the elongated carrier element is or forms part of a primary strand of the strength member or wherein the elongated carrier element forms the longitudinal core section of the strength member.

5. The rope of claim 3 wherein the elongated carrier element is a thermoplastic rod comprising the ID tags.

6. The rope according to claim 1 wherein the rope has a length of at least 100 m, a diameter of at least 10 mm, a tenacity of at least 0.8 N/tex, a maximum break load (MBL) of at least 10 kN, at least 50 ID tags distributed along the longitudinal dimension of a braided strength member, wherein the intervals are substantially equal in length and in the range of 0.5 to 5 m.

7. The rope according to claim 1 wherein the remotely detectable objects are passive and/or active ID tags.

8. The rope of claim 1, wherein the strength member further comprises primary strands comprising high performance yarns having a tenacity of at least 1.0 N/Tex as specified in ASTM D885M.

9. The rope of claim 8, wherein the high performance yarns are ultra-high molecular weight polyethylene (UHMWPE) yarns.

10. The rope of claim 8, wherein the strength member is a braided construction and wherein the ID tags are positioned without restraint between the primary strands of the braided strength member.

11. A rope monitoring system for a hoisting apparatus with at least one sheave equipped with a rope, wherein the rope is virtually separated in individual rope sections, wherein the rope comprises objects situated at intervals and distributed along the longitudinal dimension of a strength member of the rope, wherein the objects are remotely detectable, readable, and programmable identification (ID) tags, wherein at least one ID tag is provided at each individual rope section, wherein the at least one ID tag identifies the respective individual rope section, the rope being positioned as a load carrying rope along a predetermined path of the hoisting apparatus and over the at least one sheave, wherein the rope monitoring system comprises:
at least one ID tag reader device mounted along said predetermined path of the rope, the at least one ID tag reader device configured to detect at least the identity of the individual rope section provided with and identified by the at least one ID tag when traveling along said path,
at least one ID tag writing device mounted along said predetermined path of the rope, the at least one ID tag writing device configured to write a new health status of the individual rope section to the at least one ID tag when traveling along said path,
a computing unit provided with data comprising the predetermined rope path geometry and the identity and position of the at least one ID tag, the computing unit configured to:
process at least one rope operation parameter that has been measured during operation of the rope, wherein the data further comprises the at least one rope operation parameter,
compute based on said data the relative longitudinal positioning of individual sections of the rope in respect of the predetermined path of the hoisting apparatus, and the additional damage or damages suffered by individual sections of the rope during said traveling along said path under said at least one rope operation parameter,
compute and record the new health status of the individual sections of the rope, and
send the new health status of the individual sections of the rope to the corresponding at least one ID tag writing device for storing the new health status of the individual section of the rope in the corresponding at least one programmable ID tag of the rope.

12. The rope monitoring system of claim 11, wherein the computing unit is further configured to process a physical rope parameter that has been measured during operation of the rope.

13. The rope monitoring system of claim 11, wherein the at least one rope operation parameter is associated with at least one of the mass of the hoisted load, acceleration of the hoisted load, vibration of the hoisted load, operating direction of the rope, speed of the rope, acceleration of the rope, slippage of the rope, traction to the rope, pressure to the rope, tension of the rope, compression of the rope, and torsion of the rope.

14. The rope monitoring system of claim 11, wherein the computing unit is further configured to compute and record the new health status of the individual sections of the rope by aggregating the damage or damages suffered by individual sections of the rope to a parameter or parameters indicating a remaining lifetime of the individual section of the rope.

15. The rope monitoring system of claim 14, wherein the computing unit is further configured to: generate an alerting signal when the remaining lifetime of at least one virtual section of the rope reaches a predefined limit.

16. The rope monitoring system of claim 14, wherein the remaining lifetime of the individual rope sections is expressed as a percentage of the mint conditions of a new rope or rope section.

17. The rope monitoring system of claim 11, wherein the computing unit is further configured to compute and record the new health status of the individual sections of the rope by incrementally summing the respective damages of individual virtual sections of the rope for each such section for a predefined time or operation level.

18. The rope monitoring system of claim 11, wherein:
the at least one ID tag reader device is further configured to detect the historic health status of the individual rope section provided with and identified by the at least one ID tag (101) when traveling along said path; and
the computing unit is further configured to process the historic health status of the corresponding rope section to compute and record the new health status of the individual sections of the rope.

19. The rope monitoring system of claim 11, wherein the rope monitoring system further comprises the rope.

20. The rope monitoring system of claim 11, wherein the rope comprises a strength member that includes primary strands comprising high performance yarns having a tenacity of at least 1.0 N/Tex as specified in ASTM D885M.

21. A rope monitoring method for a hoisting apparatus with at least one sheave equipped with a rope, wherein the rope is virtually separated in individual rope sections, wherein the rope comprises objects situated at intervals and distributed along the longitudinal dimension of a strength member of the rope, wherein the objects are remotely detectable, readable, and programmable identification (ID) tags, wherein at least one ID tag is provided at each individual rope section, wherein the at least one ID tag identifies the respective individual rope section, the rope being positioned as a load carrying rope along a predetermined path of the hoisting apparatus and over the at least one sheave, the rope monitoring method comprising:

using at least one ID tag reader device along said predetermined path of the rope, to detect at least the identity of the individual rope section provided with and identified by the at least one ID tag when traveling along said path;

using at least one ID tag writing device along said predetermined path of the rope, to write a new health status of the individual rope section to the at least one ID tag when traveling along said path;

measuring at least one rope operation parameter during at least one operation of the rope;

storing data comprising the predetermined rope path geometry, the at least one rope operation parameter, the identity and position of the at least one ID tag;

computing, by using a computing unit and based on said data, the relative longitudinal positioning of individual sections of the rope in respect of the predetermined path of the hoisting apparatus, and the additional damage or damages suffered by individual sections of the rope during said traveling along said path under said at least one rope operation parameter;

computing and recording the new health status of the individual sections of the rope; and writing, by using the at least one ID tag writing device, the new health status of the individual section of the rope in the corresponding at least one programmable ID tag of the rope.

* * * * *